Nov. 24, 1931.  J. O. CECIL  1,833,409
RIDGING ATTACHMENT FOR FERTILIZER DISTRIBUTORS
Filed Dec. 2, 1929  2 Sheets-Sheet 2
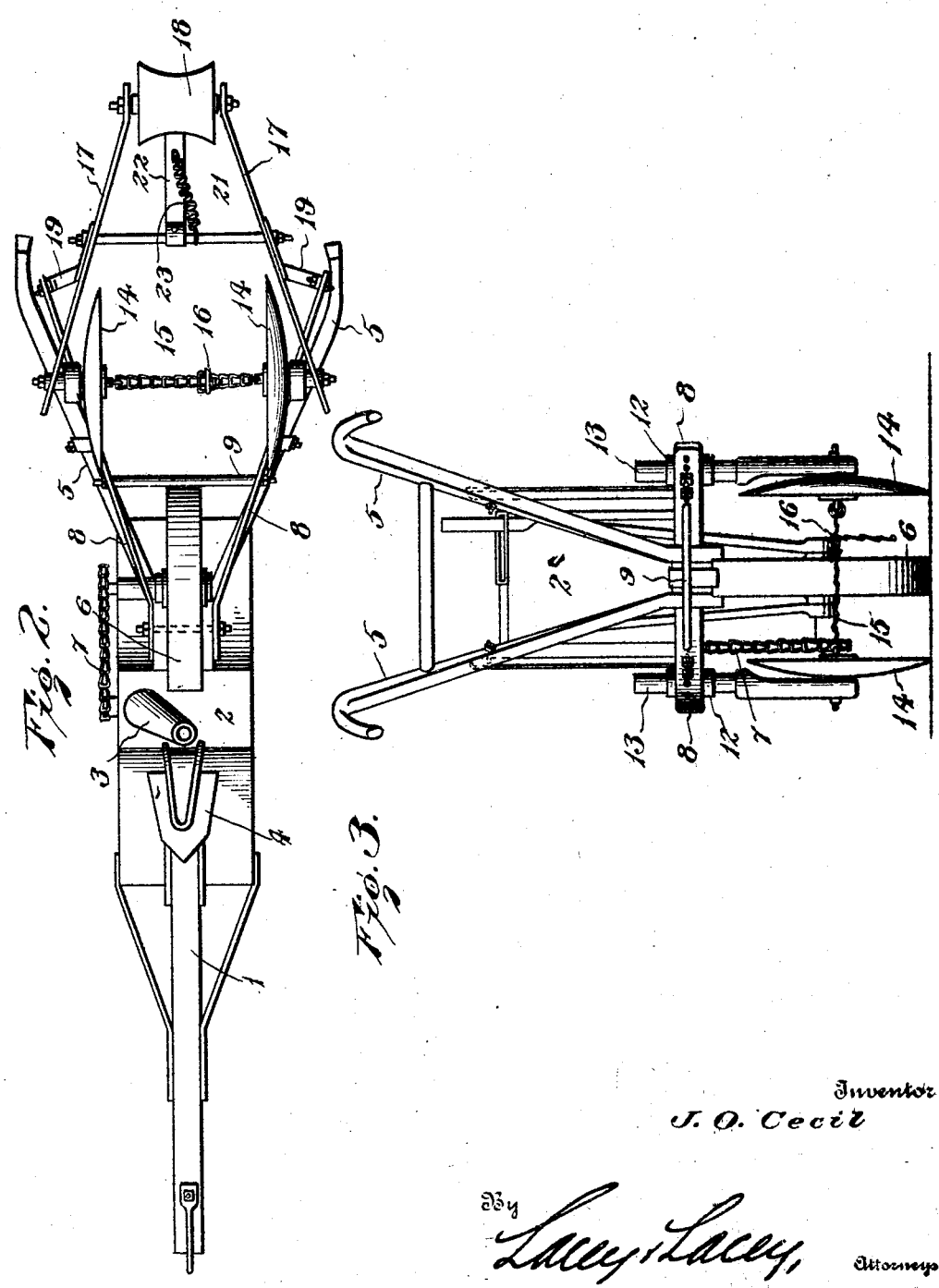
Inventor
J. O. Cecil
By Lacey & Lacey, Attorneys Patented Nov. 24, 1931

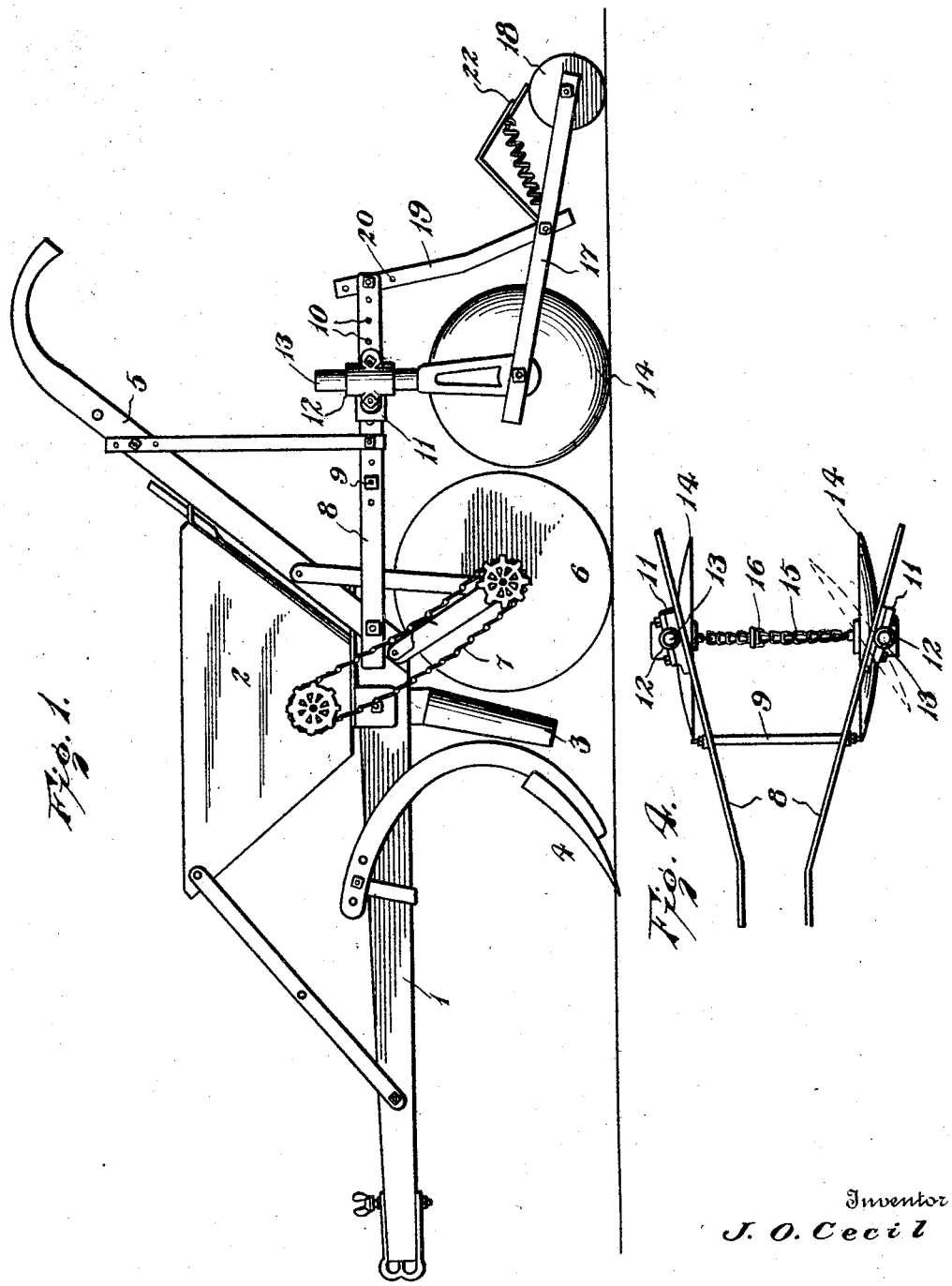

1,833,409

UNITED STATES PATENT OFFICE

JOSEPH OLIVER CECIL, OF WEST LOUISVILLE, KENTUCKY, ASSIGNOR OF ONE-HALF TO THOMAS G. HOLMAN, OF OWENSBORO, KENTUCKY

RIDGING ATTACHMENT FOR FERTIIZER DISTRIBUTORS

Application filed December 2, 1929. Serial No. 411,085.

This invention has for its object the provision of simple and efficient means for expediting the cultivation of tobacco. To successfully grow tobacco, it has been found necessary to set the young plants in fertilizer or very rich soil and it is also necessary to set the plants in hills or along the top of a ridge. Heretofore it has been necessary to manually form the hills or the ridge over the deposited fertilizer and, of course, this manual labor is very tiresome and slow. It is, therefore, the object of the present invention to provide means whereby the ridge will be formed mechanically as the fertilizer is deposited and this object is attained in such an apparatus as is illustrated in the accompanying drawings. The invention resides in certain novel features which will be hereinafter first fully described and then more particularly defined in the appended claim.

In the drawings:

Figure 1 is a side elevation of a fertilizer distributor having my attachment connected thereto, Fig. 2 is a bottom plan view of the same.

Fig. 3 is a rear elevation with the pressing roller removed, and

Fig. 4 is a detail plan view of the ridging attachment.

The distributor is shown as of the walking type and comprises a frame 1 which is adapted to be drawn over the field by draft animals and supports a hopper 2 from which a spout 3 depends to guide the fertilizer onto the ground along the line intended for the plants. The frame also carries an opener shovel 4 and at its rear end has handles 5 whereby it may be guided by an operator walking at the rear of the machine. There is also a roller 6 mounted at the rear of the frame and having its axle connected through chain and sprocket gearing, indicated at 7, with an agitator within the hopper so that caking of the fertilizer will be avoided, all these parts being well known.

In carrying out my invention, there is provided a pair of beams 8 which are secured at their front ends to the rear end of the frame and diverge rearwardly therefrom, a cross bar or round 9 being secured to and disposed between these beams so as to maintain the proper spaced relation of the same. In the rear end portions of the beams, they are provided with a longitudinal series of openings 10 adapted to receive bolts securing clamps 11 thereto, said clamps including bearings 12 through which spindles 13 are fitted, as shown. The spindles may be adjusted vertically and rotatably within the bearings 12 and will be held in a set position by the clamping bolts when the nuts on the latter are turned home, as will be understood, the disks 14 carried by the lower ends of the spindles being thereby set to run at the proper depth and at the proper angle. To prevent spreading of the disks as they are drawn along the row to form a ridge, I provide a chain 15 which is connected to the axles of the respective disks and is provided between its ends with a buckle or like device, indicated at 16, whereby the length of the chain may be easily and efficiently regulated. Mounted upon the outer ends of the axles of the ridging disks 14 are lower beams 17 which converge rearwardly and have a pressing roller 18 mounted between their rear ends, the roller being concave transversely, as indicated in Fig. 2, so that as it is drawn along the ridge formed by the disks 14 it will shape the top of the ridge into a proper water shed and will compress the soil to the desired firmness over the fertilizer. Hangers 19 are secured at their upper ends to the rear ends of the beams 8 and at their lower ends to the lower beams 17 and they are adjustable by reason of the openings 20 in an obvious manner so that the beams 17 may be set at any desired height relative to the beams 8 and the pressure exerted by the presser roller 18 thereby determined. A brace 21 extends between the lower beams 17 and a scraper 22 is carried by said brace to bear upon the presser roller 18 and keep the surface of the same in a smooth clean condition. A retractile spring 23 secured at one end to the brace 21 and at its opposite end to the scraper holds the scraper yieldably to the roller so that it will act upon the roller at all times.

The operation of the machine will be readily understood from the foregoing description, taken in connection with the accompanying drawings. The machine is drawn along the contemplated line of plants in the usual manner and the fertilizer will be deposited as desired. The ridging disks 14 will travel directly at the rear of the fertilizer distributor and will act upon the surface soil so as to heap the same in a ridge over the deposited fertilizer while the presser roller will ride upon the top of the formed ridge and impart to the soil the desired firmness. By the use of this machine, the ridge in which the plants are to be set will be very quickly formed at the same time that the fertilizer is deposited and the work will be done without calling for excessive tiring manual labor and will be accomplished in a more uniform and satisfactory manner than it could be done manually.

Having thus described the invention, I claim:

An attachment for fertilizer distributors comprising a pair of beams adapted to be connected at their front ends with the rear end of a fertilizer distributor, ridging disks carried by the rear ends of the beams, hangers secured to the rear end of the beams at the rear of the disks, lower beams extending rearwardly from the axles of the disks and supported by the lower ends of the hangers, a presser roller carried by and between the rear ends of the lower beams, a transverse brace between the lower ends of the hangers, a scraper carried by said brace with its free end resting upon the presser roller, and an elastic connection between the free end of the scraper and the brace.

In testimony whereof I affix my signature.

JOSEPH OLIVER CECIL. [L. S.]